(12) United States Patent
Qin et al.

(10) Patent No.: US 8,340,608 B2
(45) Date of Patent: Dec. 25, 2012

(54) DUAL-MODE MOBILE PHONE AND METHOD OF THE SAME FOR INHIBITING GSM/CDMA MUTUAL INTERFERENCE

(75) Inventors: Yu Qin, Shenzhen (CN); Shougang Cheng, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/125,435

(22) PCT Filed: Aug. 21, 2009

(86) PCT No.: PCT/CN2009/073401
§ 371 (c)(1),
(2), (4) Date: Apr. 21, 2011

(87) PCT Pub. No.: WO2010/045822
PCT Pub. Date: Apr. 29, 2010

(65) Prior Publication Data
US 2011/0212747 A1    Sep. 1, 2011

(30) Foreign Application Priority Data

Oct. 22, 2008  (CN) .......................... 2008 1 0216942

(51) Int. Cl.
*H01Q 11/12* (2006.01)
*H04B 1/04* (2006.01)
(52) U.S. Cl. .................... 455/127.4; 455/78; 455/114.2; 455/296
(58) Field of Classification Search ............... 455/95, 455/102, 103, 127.4, 144, 553.1, 448, 436–444; 370/331
See application file for complete search history.

(56) References Cited

U.S. PATENT DOCUMENTS 7,643,848 B2 * 1/2010 Robinett ................. 455/552.1
(Continued)

FOREIGN PATENT DOCUMENTS

CN 101094480 (A) 12/2007
(Continued)

OTHER PUBLICATIONS

International Search Report for International Application No. PCT/CN2009/073401, mailed Nov. 19, 2009.
(Continued)

*Primary Examiner* — Michael Faragalla
*Assistant Examiner* — William Lu
(74) *Attorney, Agent, or Firm* — Clark & Elbing LLP

(57) ABSTRACT

The present invention discloses a GSM/CDMA dual-mode mobile phone and method of the same for inhibiting a GC mutual interference, wherein the mobile phone comprises a dual-port antenna connected respectively with a duplexer and a GSM RF circuit and configured to access the signals of the GSM and the CDMA; a RF switch provided in the CDMA RF receiving circuit, wherein the RF switch is controlled by a GSM baseband chip and configured to cut off a CDMA signal (i.e., cutting off a receiving path of the CDMA) transmitted/received by the dual-port antenna when a GSM operational frequency and a CDMA operational frequency belong to close frequency band during a transmitting timeslot of the GSM, to enhance the isolation between a GSM signal and a CDMA signal. The present invention inhibits interference of GSM transmission with the CDMA receiving in the circuit, achieves high isolation, and also simplifies design of the antennas, lowers requirements of the double antennas on the appearance and volume of the overall machine, and improves the flexibility in the design of the dual-mode mobile phone.

11 Claims, 4 Drawing Sheets

U.S. PATENT DOCUMENTS 7,830,912 B2 * 11/2010 Lin et al. .................. 370/466
2008/0139243 A1 * 6/2008 Lin et al. .................. 455/553.1
2008/0261651 A1 * 10/2008 Nakahashi et al. ........ 455/553.1

FOREIGN PATENT DOCUMENTS

| CN | 101262674 (A) | 9/2008 |
| CN | 101394636 (A) | 3/2009 |

OTHER PUBLICATIONS

Written Opinion of the International Searching Authority for International Application No. PCT/CN2009/073401, mailed Nov. 19, 2009.

International Preliminary Report on Patentability for International Application No. PCT/CN2009/073401, issued Apr. 26, 2011.

* cited by examiner

DUAL-MODE MOBILE PHONE AND METHOD OF THE SAME FOR INHIBITING GSM/CDMA MUTUAL INTERFERENCE

CROSS-REFERENCE TO RELATED APPLICATIONS

This application is the U.S. National Stage filing under 35 U.S.C. §371 of International Application No. PCT/CN2009/073401, filed Aug. 21, 2009, which claims benefit of Chinese Patent Application No. 200810216942.8, filed Oct. 22, 2008.

FIELD OF THE INVENTION

The present invention relates to the field of a wireless communication mobile terminal, and in particular to a GSM/CDMA dual-mode mobile phone and a method of the same for inhibiting a GC mutual interference.

BACKGROUND OF THE INVENTION

A Global System for Mobile Communication (GSM for short)/Code Division Multiple Access (CDMA for short) dual-mode mobile phone is a mobile terminal that support both GSM and CDMA communication modes and can stand by in respective communication network simultaneously. This type of communication terminal requires that wireless modules supporting the two kinds of communication modes simultaneously. However, a mutual interference occurs when the operational frequencies of the two wireless modules are close to each other, such interference will affect the respective radio performances of the two wireless modules to a certain extent. This phenomenon is briefly called a GC mutual interference, that is, a GSM/CDMA mutual interference.

In the prior art, methods for inhibiting the GC mutual interference are mainly implemented by increasing the isolation between a GSM antenna and a CDMA antenna. As shown in FIG. 1, an existing GC dual-mode mobile phone comprises a CDMA RF circuit, a CDMA antenna, a GSM RF circuit, a GSM antenna and a baseband circuit, wherein the baseband circuit consists of a CDMA baseband chip and a GSM baseband chip, the above CDMA baseband chip, the CDMA RF circuit and the CDMA antenna are sequentially connected; the above GSM baseband chip, the GSM RF circuit and the GSM antennas are also sequentially connected. The antennas of an existing GC dual-mode mobile phone is realized in a manner that the GSM antenna is separated from the CDMA antenna, i.e., two antennas are used and are respectively placed at the upper and the lower ends of the mobile phone. By using this manner, it does not need to consider adopting any interference inhibition measure on the circuit, and the communication performance can be basically ensured during a practical application; however, it has the following problems.

1. The two antennas have the demand on space, which restricts the development of the modeling of the mobile phone towards miniaturization and thinness.

2. During the design process of the antennas, the isolation is mainly determined by the spatial distance between the two antennas, wherein the effects of other factors are not obvious, hence, there is not much improvement can be achieved for the RF isolation during the antenna tuning.

SUMMARY OF THE INVENTION

The present invention is proposed in view of the problems existing in the prior art that the size of the mobile phone is limited and the RF isolation is hard to be improved, which is due to the fact that the GC mutual interference is inhibited by using the method of respective GSM antenna and CDMA antenna. Therefore, the main object of the present invention is to provide a GSM/CDMA dual-mode mobile phone and its method for inhibiting the GC mutual interference.

In order to realize the above object, according to one aspect of the present invention, a GSM/CDMA dual-mode mobile phone is provided.

The GSM/CDMA dual-mode mobile phone according to the present invention comprises: a CDMA RF circuit, a GSM RF circuit, a baseband circuit comprising a CDMA baseband chip and a GSM baseband chip, with the CDMA RF circuit comprising a CDMA RF receiving circuit, a CDMA RF transmitting circuit and a duplexer, the CDMA RF transmitting circuit being connected respectively with the CDMA baseband chip and the duplexer, the CDMA RF receiving circuit comprising a CDMA receiver, a receiving filter and an LNA (i.e., a Low Noise Amplifier) which are sequentially connected, the CDMA receiver being connected with the CDMA baseband chip, the LNA being connected with the duplexer; the GSM RF circuit being connected with the GSM baseband chip; the GSM/CDMA dual-mode mobile phone also comprising:

a dual-port antenna, connected respectively with the duplexer and the GSM RF circuit, and configure to transmit/receive RF signals of the GSM and the CDMA; and RF switch(s), provided in the CDMA RF receiving circuit, wherein the RF switch(s) is controlled by the GSM baseband chip and configured to cut off, when a GSM operational frequency and a CDMA operational frequency belong to close frequency band during a transmitting timeslot of the GSM, CDMA signal(s) accessed by the dual-port antenna (i.e., cutting off the receiving path of the CDMA), so as to improve the isolation between GSM signal(s) and CDMA signal(s).

Preferably, the dual-port antenna has a common pattern, and two separate feeds for GSM and CDMA which is used to connect the signals of the GSM and the CDMA, respectively.

Preferably, the RF switch is located between the LNA and the duplexer, and configured to inhibit the strength of GSM signals entering the LNA.

Preferably, the RF switch is located between the receiving filter and the LNA, and configured to inhibit non-linear product(s) generated by the LNA.

Preferably, the RF switches are located between the LNA and the duplexer and located between the receiving filter and the LNA (i.e., there are two RF switches which are located before and after the LNA, respectively), and configured to inhibit the strength of GSM signals entering the LNA and non-linear product(s) generated by the LNA.

Preferably, the RF switch(s) is/are a single-stage or multi-stage switch(s).

According to another aspect of the present invention, a method for inhibiting a GC mutual interference of a GSM/CDMA dual-mode mobile phone is provided.

The method for inhibiting a GC mutual interference of a GSM/CDMA dual-mode mobile phone comprises the following steps:

A. a GSM baseband chip initiating a dual-mode connected status or physical channel switching in the dual-mode connected status;

B. the GSM baseband chip and a CDMA baseband chip respectively reading a GSM operational frequency and a CDMA operational frequency to be used, the GSM/CDMA dual-mode mobile phone judging whether they belong to close frequency band, wherein if yes, the GSM baseband chip initiates a switching function of an RF switch, it starts the dual-mode connected status or the channel switching in the dual-mode connected status, and it goes to step C; otherwise, it is judged that whether the switching function of the RF switch has been initiated, wherein if yes, the GSM baseband chip sets the RF switch as an always on status, it starts the dual-mode connected status or the channel switching in the dual-mode connected status, and the dual-mode connected status is ended; otherwise, the RF switch is kept as the always on status, it starts the dual-mode connected status or the channel switching in dual-mode connected status, and the dual-mode connected status is ended; and C. ending the dual-mode connected status and setting the RF switch as the always on status.

By setting an RF switch in the CDMA RF receiving circuit, the present invention inhibits, on the circuit, the interference from the GSM transmitter to the CDMA receiver, has a excellent isolation, at the same time, the design of the antennas is simplified, the requirements of the double antennas on the appearance and the volume of the overall machine are lowered, and the flexibility of the design of the dual-mode mobile phone is improved.

BRIEF DESCRIPTION OF THE ACCOMPANYING DRAWINGS

The drawings illustrated here provide a further understanding of the present invention and form a part of the present application. The exemplary embodiments and the description thereof are used to explain the present invention without unduly limiting the scope of the present invention, wherein.

DETAILED DESCRIPTION OF THE EMBODIMENTS

The present invention will be described in detail hereinafter in conjunction with the drawings thereof and the embodiments. It should be noted that the embodiments in the present application and the features of the embodiments can be combined with each other if there is no conflict.

Device Embodiment

Figure 1:
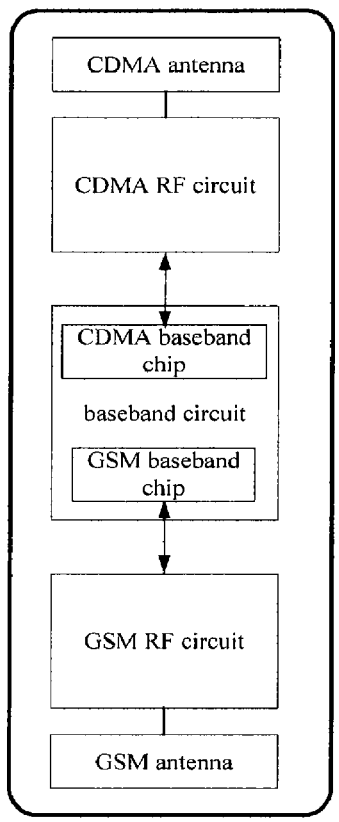
FIG. 1 is an illustrated diagram of the overall distribution of an existing GSM/CDMA dual-mode mobile phone.
Figure 2:
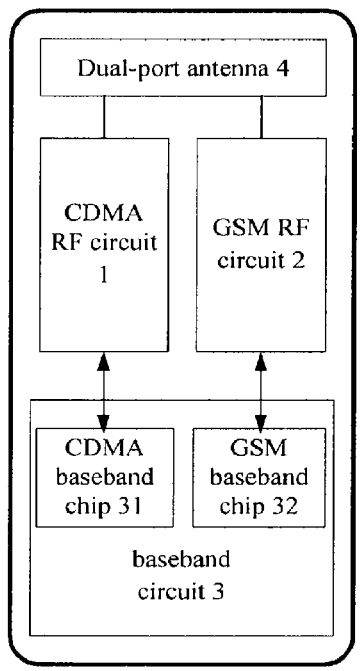
FIG. 2 is an illustrated diagram of the overall distribution of a GSM/CDMA dual-mode mobile phone according to an embodiment of the present invention.
Figure 3:
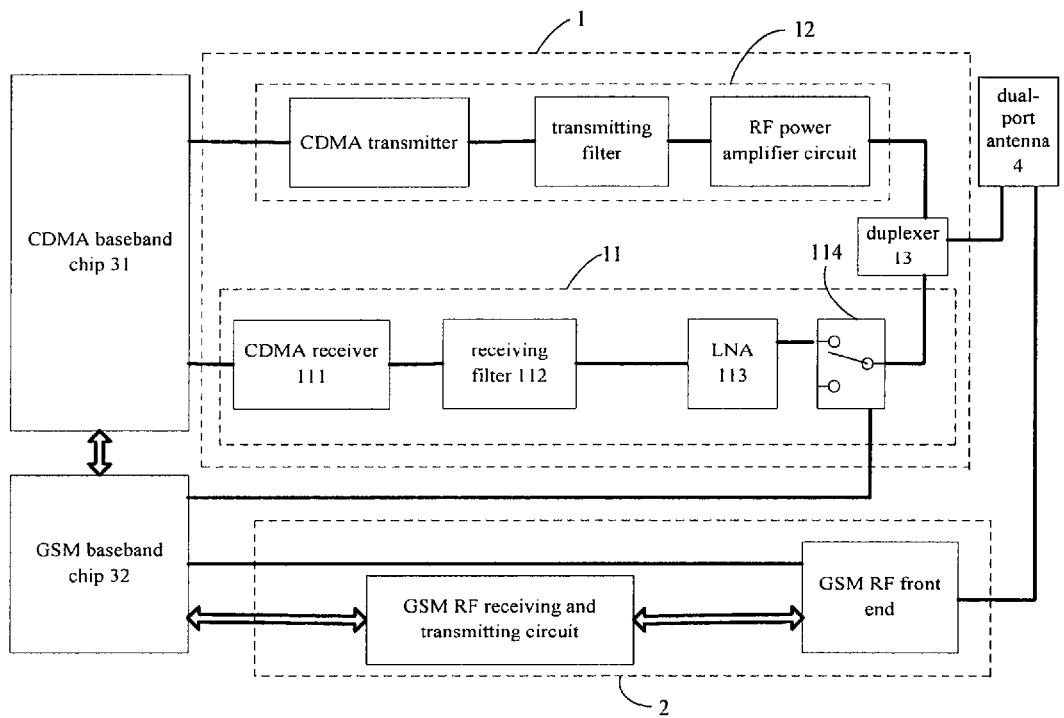
FIG. 3 is a circuit principle diagram of a GSM/CDMA dual-mode mobile phone according to an embodiment of the present invention.

FIG. 2 is an illustrated diagram of the overall distribution of a GSM/CDMA dual-mode mobile phone according to an embodiment of the present invention. As shown in FIG. 2, the GSM/CDMA dual-mode mobile phone according to the embodiment of the present invention comprises a CDMA RF circuit 1, a GSM RF circuit 2, a baseband circuit 3 comprising a CDMA baseband chip 31 and a GSM baseband chip 32, and a dual-port antenna 4. The CDMA RF circuit 1 comprises a CDMA RF receiving circuit 11, a CDMA RF transmitting circuit 12 and a duplexer 13, wherein the CDMA RF transmitting circuit 12 is connected respectively with the CDMA baseband chip 31 and the duplexer 13, the CDMA RF receiving circuit 11 comprises a CDMA receiver 111, a receiving filter 112 and an LNA 113 that are sequentially connected, the CDMA receiver 111 is connected with the CDMA baseband chip 31, and the LNA 113 is connected with the duplexer 13; the GSM RF circuit 2 is connected with the GSM baseband chip 32; the dual-port antenna 4 is connected respectively with the duplexer 13 and the GSM RF circuit 2, and has common pattern shared by GSM and CDMA with different feed connected to GSM or CDMA circuit. The embodiments of the present invention may select a RF switch with a proper isolation which is inserted into the CDMA RF receiving circuit 11. As shown in FIG. 3, the RF switch 114 may be placed between the LNA 113 and the duplexer 13 and controlled by the GSM baseband chip 32. The RF switch 114 can cut off CDMA signal(s) transmitted/received by the dual-port antenna 4 (i.e., cutting off the receiving path of the CDMA) in the case that a GSM operational frequency and a CDMA operational frequency are close to each other during the transmitting timeslot of the GSM, which inhibits the strength of the GSM signals entering the LNA 113 so as to improve the isolation between GSM signal(s) and CDMA signal(s).

Figure 4:
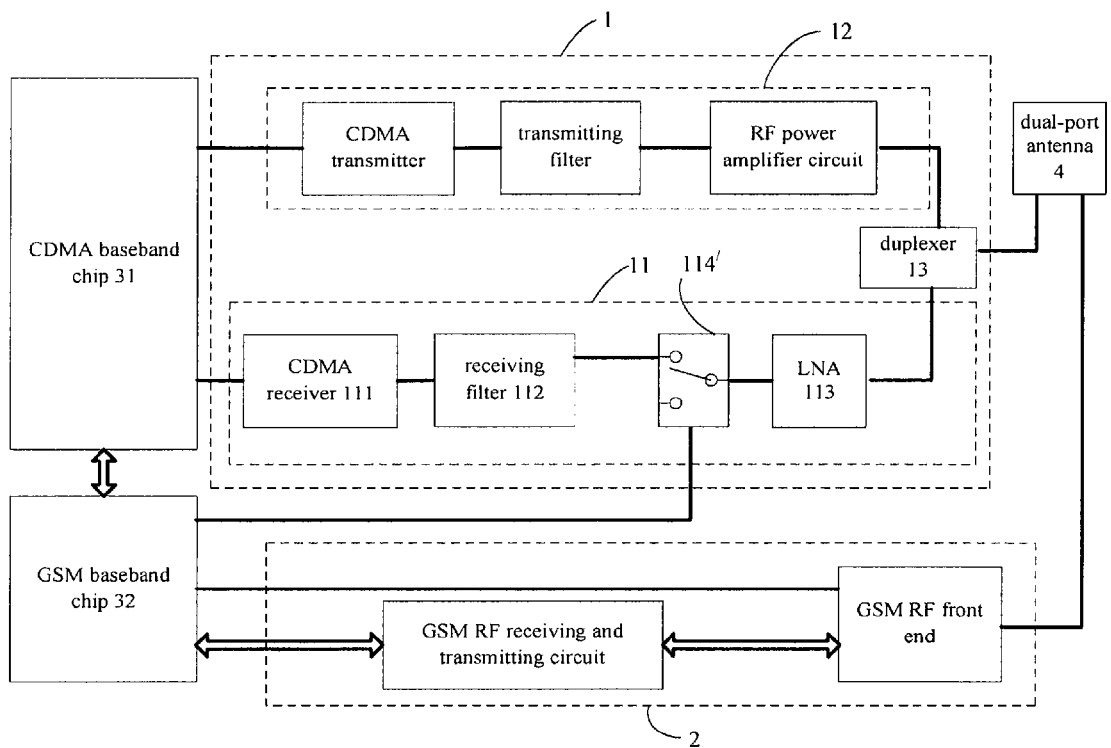
FIG. 4 is another circuit principle diagram of a GSM/CDMA dual-mode mobile phone according to an embodiment of the present invention.

FIG. 4 is another circuit principle diagram of the GSM/CDMA dual-mode mobile phone according to an embodiment of the present invention. As shown in FIG. 4, it is also possible for the RF switch 114 to be placed between the receiving filter 112 and the LNA 113, which inhibits non-linear product(s) generated by the LNA 113.

Figure 5:
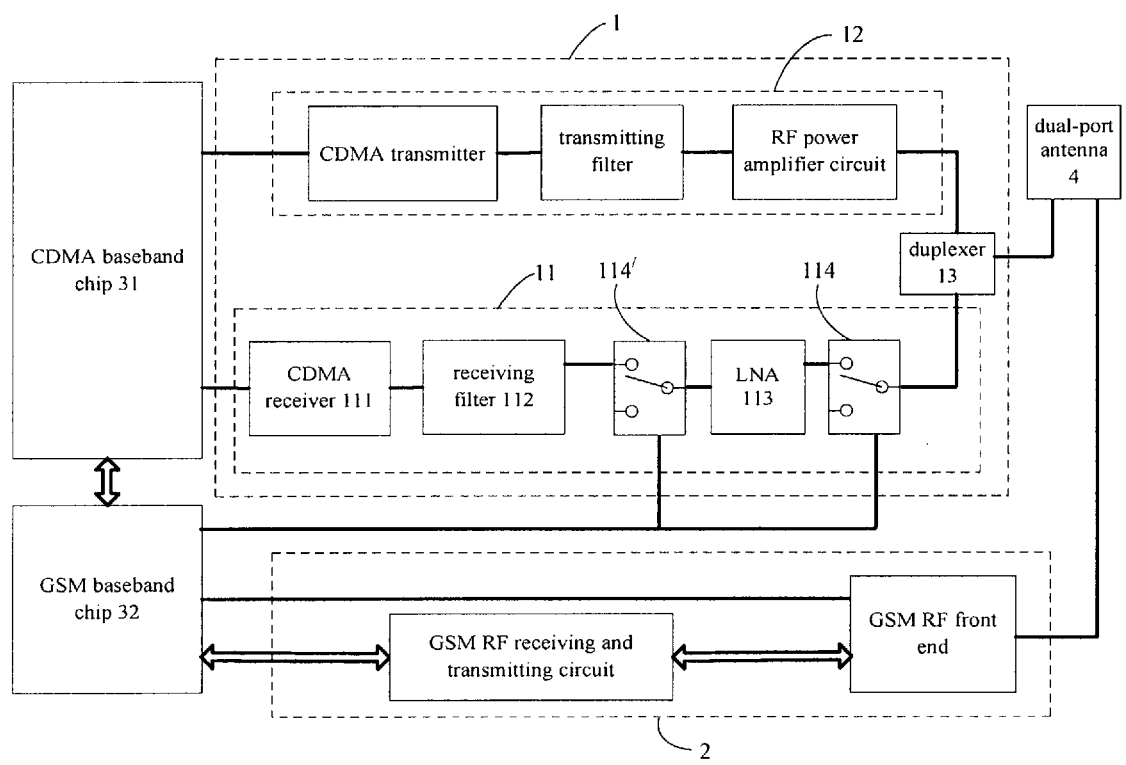
FIG. 5 is still another circuit principle diagram of a GSM/CDMA dual-mode mobile phone according to an embodiment of the present invention.

The equivalent effects are obtained by the above two manners, one of which can be used according to requirement. Alternatively, both of the above two manners are used as shown in FIG. 5, that is, RF switches 114' and 114 are respectively located before and after the LNA 113 of the CDMA RF receiving circuit 11. If there is a higher requirement on the isolation, it can be realized by using a RF switch with a higher isolation for replacement or by using a multi-stage RF switch. The RF switch in the embodiments of the present invention is controlled by the GSM baseband chip, wherein during the transmitting timeslot of the GSM, the RF switch is switched to cut off the receiving path of the CDMA; and in other timeslots of the GSM, the RF switch is switched to maintain the CDMA receiving circuit unobstructed, the switching action must be kept in strict synchronization with the GSM slot.

The GSM/CDMA dual-mode mobile phone provided by the embodiments of the present invention ensures the excellent isolation of the GC, therefore the requirement on the isolation between the antennas can be omitted, the layout manner in which the two antennas are respectively placed at the upper and the lower ends of the mobile phone can be changed, that is, the antennas can be placed at the same end of the mobile phone. Further, since it is possible that the isolation between the antennas is not considered, the two antennas placed at the same end is equivalent to an antenna covering a wide frequency band, and at the same time, in order to meet the need of dual-network standby, the antenna needs two ports configured to access the signals of the GSM and the CDMA respectively.

Figure 6:
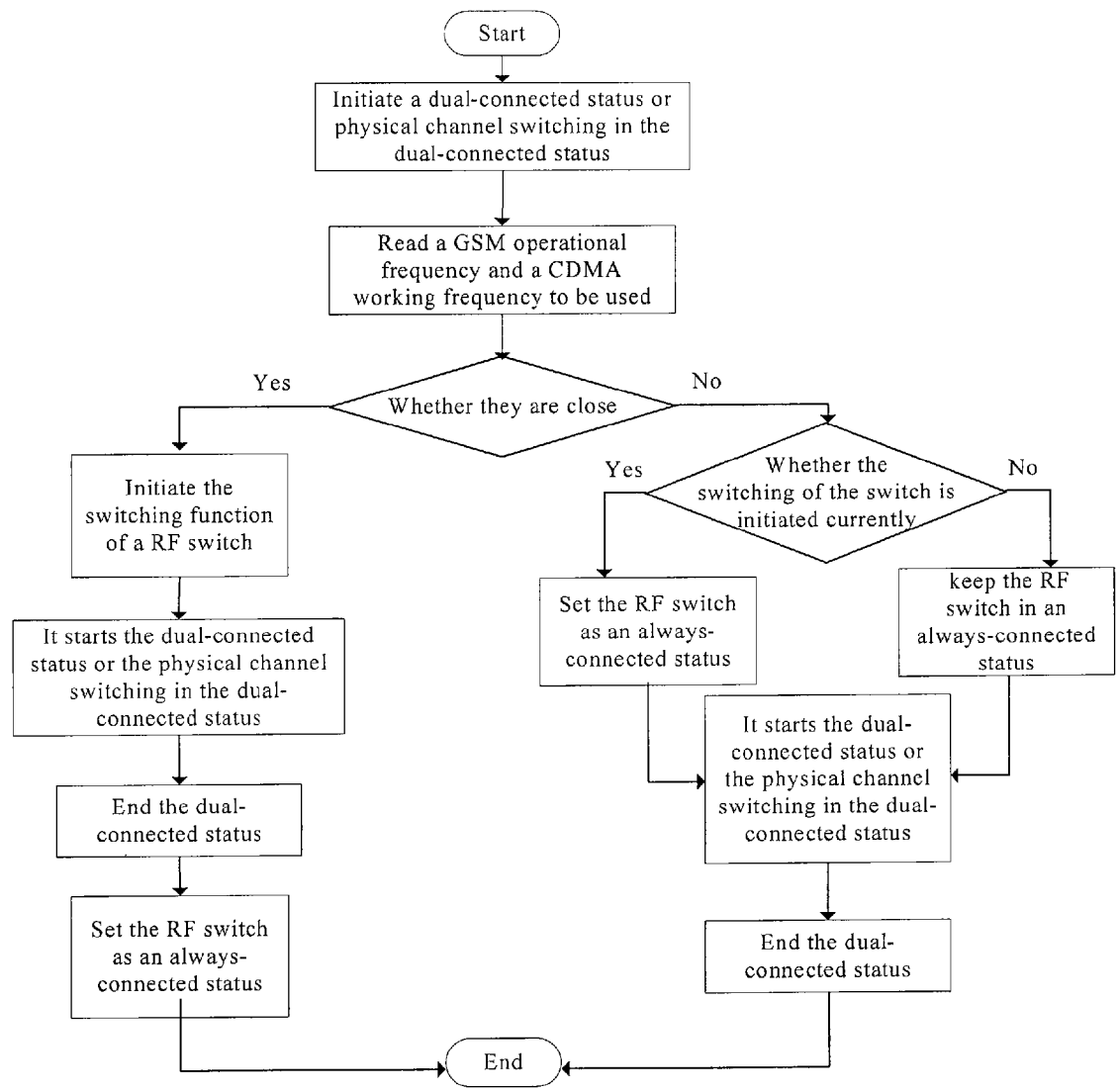
FIG. 6 is a schematic diagram of the flow of a GSM/CDMA dual-mode mobile phone for inhibiting a GC mutual interference according to an embodiment of the present invention.

Since the GC mutual interference is obvious only when the receiving frequency of the CDMA and the transmitting frequency of the GSM are close to each other, it is not necessary that in all the combinations of the GSM and the CDMA channels, the RF switch is switched for the receiving path of the CDMA. Hence, channel combination(s) with a strong GC mutual interference can be determined in advance, that is, the channel combination(s) whose CDMA receiving sensitivity can be improved after switching the RF switch. A channel combination judgment can be added into a hardware driver program to determine whether to switch the RF switch. FIG. 6 is a schematic diagram of the flow of the GSM/CDMA dual-mode mobile for inhibiting the GC mutual interference according to an embodiment of the present invention. As shown in FIG. 6:

first, a GSM baseband chip prepares to initiate a dual-mode connected status or a physical channel switching in the dual-mode connected status; the RF switch is always on before the initiation, and the RF switch starts switching after the initiation, such that the receiving path of the CDMA is switched between two statuses of "connected" and "disconnected", so as to ensure that the receiving path of the CDMA is cut off during the transmitting timeslot of the GSM and is connected when not the transmitting timeslot of the GSM;

secondly, the GSM baseband chip and a CDMA baseband chip respectively read a GSM operational frequency and a CDMA operational frequency to be used; the mobile phone judges whether they belong to the close frequency band, wherein if yes, the GSM baseband chip initiates a switching function of the RF switch, it starts the dual-mode connected status or the channel switching in dual-mode connected status, and then the dual-mode connected status is ended and the RF switch is set as the always on status; otherwise, it is judged that whether the switching function of the RF switch has been initiated, wherein if yes, the GSM baseband chip sets the RF switch as the always on status, it starts the dual-mode connected status or the channel switching in dual-mode connected status, and then the dual-mode connected status is ended; otherwise, the RF switch is kept as the always on status, the channel switching in the dual-mode connected status or the dual-mode connected status is started, and then the dual-mode connected status is ended.

The above dual-mode connected status refers to that the mobile phone communicates simultaneously in the GSM and the CDMA modes; the channel switching in the dual-mode connected status refers to that the original status is the dual-mode connected status and the RF switch is not initiated because it is judged that there is a long distance between the operational frequencies of the GSM and the CDMA, however, currently the channel switching needs to be performed because of external factors (for example, the mobile phone is moving into another cell), at this time it is determined that the operational frequencies of the GSM and the CDMA are close and the RF switch must be initiated, and such channel switching is preformed in the case that the dual-mode connected status is kept. When the GSM or the CDMA is in a connected status (called as a single-mode connected status) and another phone (a CDMA or a GSM) is calling in, the mobile phone needs to judge whether the channels of the two calls are close channels, wherein if yes, it is necessary to initiate the switching function of the RF switch and make the mobile phone enter the dual-mode connected status. If the user of the mobile phone needs to answer a latter calling call with hanging up a former call or answer the later call while keeping the former call and continue the former call after finishing the latter call, all these situations belong to the ending of the dual-mode connected status, and at this time it is necessary to set the RF switch as the always on status again.

For the GSM/CDMA dual-mode mobile phone, due to the operational frequency band, the GC mutual interference is mainly presented as the interference of the transmitting power of the GSM900M frequency band with the receiving signals of the CDMA800M frequency band.

Method Embodiment

According to an embodiment of the present invention, a method for inhibiting a GC mutual interference of a GSM/CDMA dual-mode mobile phone is provided, and the method comprises the following steps:

A. a GSM baseband chip initiating a dual-mode connected status or physical channel switching in the dual-mode connected status;

B. the GSM baseband chip and a CDMA baseband chip respectively reading a GSM operational frequency and a CDMA operational frequency to be used, and the GSM/CDMA dual-mode mobile phone judging whether they belong to close frequency band, wherein if yes, the GSM baseband chip initiates a switching function of a RF switch, it starts the dual-mode connected status or the channel switching in dual-mode connected status, and it goes to step C; otherwise, it is judged that whether the switching function of the RF switch has been initiated, wherein if yes, the GSM baseband chip sets the RF switch as an always on status, it starts the dual-mode connected status or the channel switching in dual-mode connected status, and the dual-mode connected status is ended; otherwise, the RF switch is kept as the always on status, it starts the dual-mode connected status or the channel switching in the dual-mode connected status, and the dual-mode connected status is ended; and C. ending the dual-mode connected status and setting the RF switch as the always on status.

By using the technical solutions provided by the embodiments of the present invention, on the one hand, the interference of GSM transmission with the CDMA receiving is inhibited in the circuit, and on the other hand, the design of the antennas is simplified, the requirements of the double antennas on the appearance and the volume of the overall machine are lowered, and the flexibility of the design of the dual-mode mobile phone is improved.

In addition, as the implementation does not change the system architecture or the current processing flow, the present invention is easy to be realized and easy to be popularized in the technical field, therefore the present invention has a higher industrial applicability.

Described above are just preferable embodiments of the present invention and are not intended to restrict the present invention. It should be indicated that, for one skilled in the art, corresponding equivalent alterations or substitutions can be made according to the technical solutions of the present invention and the concepts thereof, for example, the implementation manners of dual-port antennas or multi-port antennas of other types of dual-mode mobile phones or multi-mode mobile phones. All the alterations and substitutions shall be contained within the protection scope of the present invention.

What is claimed is:

1. A Global System for Mobile Communication GSM/Code Division Multiple Access CDMA dual-mode mobile phone, comprising: a CDMA RF circuit, a GSM RF circuit, a baseband circuit comprising a CDMA baseband chip and a GSM baseband chip, with the CDMA RF circuit comprising a CDMA RF receiving circuit, a CDMA RF transmitting circuit and a duplexer, the CDMA RF transmitting circuit being connected respectively with the CDMA baseband chip and the duplexer, the CDMA RF receiving circuit comprising a CDMA receiver, a receiving filter and a Low Noise Amplifier LNA which are sequentially connected, the CDMA receiver being connected with the CDMA baseband chip, the LNA being connected with the duplexer; the GSM RF circuit being connected with the GSM baseband chip; the mobile phone further comprising: a dual-port antenna, connected respectively with the duplexer and the GSM RF circuit, and configured to transmit/receive signals of the GSM and the CDMA; and RF switch(s), provided in the CDMA RF receiving circuit, wherein the RF switch(s) is controlled by the GSM baseband chip and configured to cut off, when the GSM RF and the CDMA RF work at near frequency during a transmitting timeslot of the GSM, CDMA signal(s) accessed by the dual-port antenna.

2. The GSM/CDMA dual-mode mobile phone according to claim 1, wherein the dual-port antenna has a common pattern shared by a GSM antenna and a CDMA antenna with different feed connected to GSM or CDMA circuit.

3. The GSM/CDMA dual-mode mobile phone according to claim 2, wherein the RF switch is located between the LNA and the duplexer, and configured to inhibit the strength of GSM signals entering the LNA.

4. The GSM/CDMA dual-mode mobile phone according to claim 2, wherein the RF switch is located between the receiving filter and the LNA, and configured to inhibit non-linear product(s) generated by the LNA.

5. The GSM/CDMA dual-mode mobile phone according to claim 2, wherein the RF switches are located between the LNA and the duplexer and located between the receiving filter and the LNA, and configured to inhibit the strength of GSM signals entering the LNA and non-linear product(s) generated by the LNA.

6. The GSM/CDMA dual-mode mobile phone according to claim 1, characterized in that the RF switch(s) is/are single-stage or multi-stage switch(s).

7. A method for inhibiting a GC mutual interference of a GSM/CDMA dual-mode mobile phone, comprising the following steps: A. a GSM baseband chip initiating a dual-mode connected status or physical channel switching in the dual-mode connected status; B. the GSM baseband chip and a CDMA baseband chip respectively reading a GSM operational frequency and a CDMA operational frequency to be used, the GSM/CDMA dual-mode mobile phone judging whether they belong to close frequency band, wherein when yes, the GSM baseband chip initiates a switching function of a RF switch, it starts the dual-mode connected status or the channel switching in dual-mode connected status, and it goes to step C; otherwise, it is judged that whether the switching function of the RF switch has been initiated, wherein when yes, the GSM baseband chip sets the RF switch as an always on status, it starts the dual-mode connected status or the channel switching in dual-mode connected status, and the dual-mode connected status is ended; otherwise, the RF switch is kept as the always on status, it starts the dual-mode connected status or the channel switching in the dual-mode connected status, and the dual-mode connected status is ended; and C. ending the dual-mode connected status and setting the RF switch as the always on status.

8. The GSM/CDMA dual-mode mobile phone according to claim 2, characterized in that the RF switch(s) is/are single-stage or multi-stage switch(s).

9. The GSM/CDMA dual-mode mobile phone according to claim 3, characterized in that the RF switch(s) is/are single-stage or multi-stage switch(s).

10. The GSM/CDMA dual-mode mobile phone according to claim 4, characterized in that the RF switch(s) is/are single-stage or multi-stage switch(s).

11. The GSM/CDMA dual-mode mobile phone according to claim 5, characterized in that the RF switch(s) is/are single-stage or multi-stage switch(s).

* * * * *